(12) United States Patent
Li et al.

(10) Patent No.: US 11,259,335 B2
(45) Date of Patent: Feb. 22, 2022

(54) RESOURCE ALLOCATION METHOD, TERMINAL, AND NETWORK DEVICE

(71) Applicant: Huawei Technologies Co., Ltd., Shenzhen (CN)

(72) Inventors: Junchao Li, Shanghai (CN); Hao Tang, Shanghai (CN); Zhenfei Tang, Shanghai (CN); Xinghua Song, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 97 days.

(21) Appl. No.: 16/786,280

(22) Filed: Feb. 10, 2020

(65) Prior Publication Data

US 2020/0178315 A1 Jun. 4, 2020

Related U.S. Application Data

(63) Continuation of application No. PCT/CN2018/095642, filed on Jul. 13, 2018.

(30) Foreign Application Priority Data

Aug. 11, 2017 (CN) .......................... 201710683685.8

(51) Int. Cl.
*H04W 74/08* (2009.01)
*H04W 72/04* (2009.01)
*H04W 16/14* (2009.01)

(52) U.S. Cl.
CPC ....... *H04W 74/0833* (2013.01); *H04W 16/14* (2013.01); *H04W 72/04* (2013.01); *H04W 72/0453* (2013.01)

(58) Field of Classification Search
CPC . H04W 28/20; H04W 74/0833; H04W 16/14; H04W 72/0453
See application file for complete search history.

(56) References Cited

U.S. PATENT DOCUMENTS 11,051,262 B2 * 6/2021 Qian .................... H04B 7/0695
2012/0082107 A1 4/2012 Ou et al.
(Continued)

FOREIGN PATENT DOCUMENTS

CN 102325382 A 1/2012
CN 104186020 A 12/2014
(Continued)

OTHER PUBLICATIONS

LG Electronics, "Remaining details on wider bandwidth operation", 3GPP TSG RAN WG1 Meeting Ad-Hoc R1-1710352, Qingdao, P.R. China Jun. 27-30, 2017, 10 pages.
(Continued)

*Primary Examiner* — Raj Jain
(74) *Attorney, Agent, or Firm* — Slater Matsil, LLP

(57) ABSTRACT

This application provides a resource configuration method, a terminal, and a network device. The method includes: determining a second frequency domain resource based on a physical random access channel frequency domain resource used by a terminal to send a random access preamble, where the second frequency domain resource is used to transmit at least one of physical signal information or physical channel information. In embodiments of this application, when the network device configures a plurality of uplink frequency domain resources used to send a random access message 3, the terminal may determine a to-be-used uplink frequency domain resource according to the method provided in this application.

12 Claims, 7 Drawing Sheets

(56) References Cited

U.S. PATENT DOCUMENTS

| | | | |
|---|---|---|---|
| 2012/0140802 A1* | 6/2012 | Sutton | H04L 5/0066 375/219 |
| 2014/0126530 A1* | 5/2014 | Siomina | H04W 52/244 370/330 |
| 2014/0198742 A1* | 7/2014 | Baldemair | H04W 74/0833 370/329 |
| 2016/0309518 A1 | 10/2016 | Patel et al. | |
| 2017/0012761 A1* | 1/2017 | Koorapaty | H04W 72/0453 |
| 2017/0094547 A1* | 3/2017 | Yum | H04W 56/001 |
| 2018/0049068 A1* | 2/2018 | Agiwal | H04W 74/0833 |
| 2019/0166627 A1* | 5/2019 | Takeda | H04W 72/0446 |
| 2019/0182872 A1* | 6/2019 | Chen | H04W 74/0833 |
| 2019/0215828 A1* | 7/2019 | Kim | H04W 48/08 |
| 2020/0178315 A1* | 6/2020 | Li | H04W 72/04 |
| 2020/0252934 A1* | 8/2020 | Xue | H04L 5/0001 |

FOREIGN PATENT DOCUMENTS

| | | |
|---|---|---|
| CN | 104521311 A | 4/2015 |
| CN | 104581924 A | 4/2015 |

OTHER PUBLICATIONS

Panasonic: "on default bandwidth part", 3GPP Draft; R1-1710787, Jun. 15, 2017 (Jun. 15, 2017), 6 pages.

Huawei, HiSilicon, "Overview of wider bandwidth operations", 3GPP TSG RAN WG1 NR Ad Hoc Meeting, R1-1709972, Qingdao, China, Jun. 27-30, 2017, 9 pages.

3GPP TS 36.300 V14.3.0 (Jun. 2017), 3rd Generation Partnership Project; Technical Specification Group Radio Access Network;Evolved Universal Terrestrial Radio Access (E-UTRA) and Evolved Universal Terrestrial Radio Access Network (E-UTRAN); Overall description; Stage 2(Release 14), 331 pages.

3GPP TS 38.211 V0.1.0 (Jun. 2017), 3rd Generation Partnership Project; Technical Specification Group Radio Access Network; NR; Physical channels and modulation (Release 15), 22 pages.

Motorola Mob! Lity et al: "PUCCH resource allocation for HARQ-ACK feedback to Msg 4", R1-1711283, Jun. 19, 2017 (Jun. 19, 2017), 4 pages.

3GPP TS 38.321 V0.2.0 (Aug. 2017), 3rd Generation Partnership Project; Technical Specification Group Radio Access Network; NR;Medium Access Control (MAC) protocol specification(Release 15), 36 pages.

Intel Corporation: "Resource allocation for PUCCH during initial access", 3GPP Draft; R1-1710557, Jun. 17, 2017 (Jun. 17, 2017), 4 pages.

3GPP TS 38.331 V0.0.4 (Jun. 2017), 3rd Generation Partnership Project; Technical Specification Group Radio Access Network; NR;Radio Resource Control (RRC); Protocol specification (Release 15), 22 pages.

Nec, "PRB indexing for RMSI in NR", 3GPP TSG-RAN WG1 NR Ad-Hoc#2, R1-1710244, Jun. 27-30, 2017, 5 pages, Qingdao, P.R. China.

* cited by examiner

RESOURCE ALLOCATION METHOD, TERMINAL, AND NETWORK DEVICE

CROSS-REFERENCE TO RELATED APPLICATIONS

This application is a continuation of International Application No. PCT/CN2018/095642, filed on Jul. 13, 2018, which claims priority to Chinese Patent Application No. 201710683685.8, filed on Aug. 11, 2017. The aforementioned applications are hereby incorporated by reference in their entireties.

TECHNICAL FIELD

This application relates to the field of communications technologies, and specifically, to a resource allocation method, a terminal, and a network device.

BACKGROUND

A Long Term Evolution (LTE) system standard formulated by the 3rd Generation Partnership Project (3GPP) is considered as a fourth generation wireless access system standard. In LTE, allocation of a frequency domain resource of a carrier bandwidth part used by a terminal needs to depend on a bandwidth size of a system bandwidth. However, due to varied requirements of a scenario and a service in a communications system, in a next-generation communications system such as a new radio (NR) system or a 5th generation (5G) wireless access system, the system can support terminals having different capabilities and/or requirements, and a network device configures a plurality of uplink frequency domain resources used to send a random access message 3 or an acknowledgement of a random access message 4. Therefore, how the terminal determines a to-be-used uplink frequency domain resource becomes a problem that urgently needs to be resolved.

SUMMARY

This application provides a resource allocation method, so that when a network device configures a plurality of uplink frequency domain resources, a terminal supporting different capabilities and/or requirements can determine one uplink frequency domain resource thereof to send uplink physical signal information or uplink physical channel information, thereby effectively reducing signaling overheads.

According to a first aspect, this application provides a resource allocation method, including: determining, by a terminal, a second frequency domain resource based on first information corresponding to a first frequency domain resource, where the first frequency domain resource is a physical random access channel frequency domain resource used by the terminal to send a random access preamble, and the first frequency domain resource and the second frequency domain resource are on a same carrier; and transmitting, by the terminal, at least one of uplink physical signal information and uplink physical channel information on the second frequency domain resource, where the first information corresponding to the first frequency domain resource includes at least one of the following information: an index of the first frequency domain resource; frequency domain location information of the first frequency domain resource; a bandwidth of the first frequency domain resource; a parameter corresponding to the first frequency domain resource; an index of a random access preamble corresponding to the first frequency domain resource; a subcarrier spacing of the random access preamble; a bandwidth of the random access preamble; a cyclic prefix time length of the random access preamble; or a sequence length of the random access preamble.

In this application, the terminal and the network device determine the second frequency domain resource respectively by sending and receiving a PRACH resource of the random access preamble, and send or receive data on the second frequency domain resource. In this way, the terminal may determine one of a plurality of second frequency domain resources for use based on a service requirement and/or a network environment, thereby reducing resource configuration signaling overheads.

In an optional design, the determining, by a terminal, a second frequency domain resource based on first information corresponding to a first frequency domain resource specifically includes: determining, by the terminal, the second frequency domain resource based on a mapping manner between the first information corresponding to the first frequency domain resource and second information corresponding to the second frequency domain resource, where the second information corresponding to the second frequency domain resource includes at least one of an index of the second frequency domain resource, frequency domain location information of the second frequency domain resource, a bandwidth of the second frequency domain resource, and a parameter corresponding to the second frequency domain resource.

In an optional design, the first information corresponding to the first frequency domain resource includes the frequency domain location information of the first frequency domain resource, the second information corresponding to the second frequency domain resource includes the frequency domain location information of the second frequency domain resource, and the determining, by the terminal, the second frequency domain resource based on a mapping manner between the first information corresponding to the first frequency domain resource and second information corresponding to the second frequency domain resource specifically includes: determining, by the terminal, a second location of the second frequency domain resource based on a first location of the first frequency domain resource and an offset between the first location and the second location, and determining the second frequency domain resource based on the second location and the bandwidth of the second frequency domain resource.

In an optional design, the terminal may receive third indication information sent by a network device, where the third indication information is used to indicate the offset between the first location of the first frequency domain resource and the second location of the carrier bandwidth part. In this way, the network device may flexibly indicate the offset of the second location relative to the first location, and the user equipment determines the second location of the carrier bandwidth part based on the third indication information, thereby improving resource allocation flexibility.

In an optional design, the mapping manner is preset.

In an optional design, the method further includes: receiving, by the terminal, first indication information sent by the network device, where the first indication information is used to indicate the mapping manner.

In an optional design, the first indication information is carried in a system information block.

In an optional design, the mapping manner is one of a plurality of mapping manners, and the plurality of mapping manners include at least one of the following manners:

Manner 1: the index of the first frequency domain resource is mapped to the index of the second frequency domain resource;

Manner 2: the index of the first frequency domain resource is mapped to the parameter corresponding to the second frequency domain resource;

Manner 3: the index of the first frequency domain resource is mapped to the bandwidth of the second frequency domain resource;

Manner 4: the index of the first frequency domain resource is mapped to the frequency domain location of the second frequency domain resource;

Manner 5: the index of the random access preamble corresponding to the first frequency domain resource is mapped to the index of the second frequency domain resource;

Manner 6: the index of the random access preamble corresponding to the first frequency domain resource is mapped to the parameter corresponding to the second frequency domain resource;

Manner 7: the index of the random access preamble corresponding to the first frequency domain resource is mapped to the bandwidth of the second frequency domain resource;

Manner 8: the index of the random access preamble corresponding to the first frequency domain resource is mapped to the frequency domain location of the second frequency domain resource;

Manner 9: the parameter corresponding to the first frequency domain resource is mapped to the index of the second frequency domain resource;

Manner 10: the parameter corresponding to the first frequency domain resource is mapped to the parameter corresponding to the second frequency domain resource;

Manner 11: the parameter corresponding to the first frequency domain resource is mapped to the bandwidth of the second frequency domain resource;

Manner 12: the parameter corresponding to the first frequency domain resource is mapped to the frequency domain location of the second frequency domain resource;

Manner 13: a parameter corresponding to the random access preamble is mapped to the index of the second frequency domain resource;

Manner 14: the parameter corresponding to the random access preamble is mapped to the parameter corresponding to the second frequency domain resource;

Manner 15: the parameter corresponding to the random access preamble is mapped to the bandwidth of the second frequency domain resource;

Manner 16: the parameter corresponding to the random access preamble is mapped to the frequency domain location of the second frequency domain resource;

Manner 17: the bandwidth of the first frequency domain resource is mapped to the index of the second frequency domain resource;

Manner 18: the bandwidth of the first frequency domain resource is mapped to the parameter corresponding to the second frequency domain resource;

Manner 19: the bandwidth of the first frequency domain resource is mapped to the bandwidth of the second frequency domain resource;

Manner 20: the bandwidth of the first frequency domain resource is mapped to the frequency domain location of the second frequency domain resource;

Manner 21: the bandwidth of the random access preamble is mapped to the index of the second frequency domain resource;

Manner 22: the bandwidth of the random access preamble is mapped to the parameter corresponding to the second frequency domain resource;

Manner 23: the bandwidth of the random access preamble is mapped to the bandwidth of the second frequency domain resource;

Manner 24: the bandwidth of the random access preamble is mapped to the frequency domain location of the second frequency domain resource;

Manner 25: the frequency domain location of the first frequency domain resource is mapped to the index of the second frequency domain resource;

Manner 26: the frequency domain location of the first frequency domain resource is mapped to the parameter corresponding to the second frequency domain resource;

Manner 27: the frequency domain location of the first frequency domain resource is mapped to the bandwidth of the second frequency domain resource;

Manner 28: the frequency domain location of the first frequency domain resource is mapped to the frequency domain location of the second frequency domain resource;

Manner 29: the CP time length of the random access preamble is mapped to the index of the second frequency domain resource;

Manner 30: the CP time length of the random access preamble is mapped to the parameter corresponding to the second frequency domain resource;

Manner 31: the CP time length of the random access preamble is mapped to the bandwidth of the second frequency domain resource;

Manner 32: the CP time length of the random access preamble is mapped to the frequency domain location of the second frequency domain resource;

Manner 33: the sequence length of the random access preamble is mapped to the index of the second frequency domain resource;

Manner 34: the sequence length of the random access preamble is mapped to the parameter corresponding to the second frequency domain resource;

Manner 35: the sequence length of the random access preamble is mapped to the bandwidth of the second frequency domain resource; and Manner 36: the sequence length of the random access preamble is mapped to the frequency domain location of the second frequency domain resource.

In an optional design, the terminal receives second indication information sent by the network device, where the second indication information is carried in a system information block, the second indication information is used to indicate a plurality of candidate second frequency domain resources, and the plurality of candidate second frequency domain resources include the second frequency domain resource.

In an optional design, the terminal may determine at least one of the following information based on the second indication information: an index of at least one candidate second frequency domain resource, a parameter corresponding to the at least one candidate second frequency domain resource, a frequency domain location of the at least one candidate second frequency domain resource, and a bandwidth of the at least one candidate second frequency domain resource. It can be understood that the index of the at least one candidate second frequency domain resource is an index of each candidate second frequency domain resource included in the at least one candidate second frequency domain resource; the parameter corresponding to the at least one candidate second frequency domain resource is a parameter corresponding to each candidate second frequency domain resource included in the at least one candidate second frequency domain resource; the frequency domain location of the at least one candidate second frequency domain resource is a frequency domain location of each candidate second frequency domain resource included in the at least one candidate second frequency domain resource; and the bandwidth of the at least one candidate second frequency domain resource is a bandwidth of each candidate second frequency domain resource included in the at least one candidate second frequency domain resource.

In an optional design, the uplink physical channel information includes a random access message 3 and/or an acknowledgement of a random access message 4.

According to a second aspect, this application provides a resource allocation method, including: receiving, by a network device on a first frequency domain resource, a random access preamble sent by a terminal, where the first frequency domain resource is a physical random access channel frequency domain resource used by the terminal to send the random access preamble; determining, by the network device, a second frequency domain resource based on first information corresponding to the first frequency domain resource, where the first frequency domain resource and the second frequency domain resource are on a same carrier; and receiving, by the network device, at least one of uplink physical signal information and uplink physical channel information from the terminal on the second frequency domain resource, where the first information corresponding to the first frequency domain resource includes at least one of the following information: an index of the first frequency domain resource; frequency domain location information of the first frequency domain resource; a bandwidth of the first frequency domain resource; a parameter corresponding to the first frequency domain resource; an index of a random access preamble corresponding to the first frequency domain resource; a subcarrier spacing of the random access preamble; a bandwidth of the random access preamble; a cyclic prefix time length of the random access preamble; and a sequence length of the random access preamble.

For technical effects, refer to the foregoing description of the terminal.

In an optional design, the determining, by the network device, a second frequency domain resource based on first information corresponding to the first frequency domain resource specifically includes: determining, by the network device, the second frequency domain resource based on a mapping manner between the first information corresponding to the first frequency domain resource and second information corresponding to the second frequency domain resource, where the second information corresponding to the second frequency domain resource includes at least one of frequency domain location information of the second frequency domain resource, an index of the second frequency domain resource, a bandwidth of the second frequency domain resource, and a parameter corresponding to the second frequency domain resource.

In an optional design, the first information corresponding to the first frequency domain resource includes the frequency domain location information of the first frequency domain resource, the second information corresponding to the second frequency domain resource includes the frequency domain location information of the second frequency domain resource, and the determining, by the network device, the second frequency domain resource based on a mapping manner between the first information corresponding to the first frequency domain resource and second information corresponding to the second frequency domain resource specifically includes: determining, by the network device, a second location of the second frequency domain resource based on a first location of the first frequency domain resource and an offset between the first location and the second location, and determining the second frequency domain resource based on the second location and the bandwidth of the second frequency domain resource.

In an optional design, the mapping manner is preset.

In an optional design, the method further includes: sending, by the network device, first indication information to the terminal, where the first indication information is used to indicate the mapping manner.

In an optional design, the mapping manner is one of a plurality of mapping manners, and the plurality of mapping manners include at least one of the following manners:

Manner 1: the index of the first frequency domain resource is mapped to the index of the second frequency domain resource;

Manner 2: the index of the first frequency domain resource is mapped to the parameter corresponding to the second frequency domain resource;

Manner 3: the index of the first frequency domain resource is mapped to the bandwidth of the second frequency domain resource;

Manner 4: the index of the first frequency domain resource is mapped to the frequency domain location of the second frequency domain resource;

Manner 5: the index of the random access preamble corresponding to the first frequency domain resource is mapped to the index of the second frequency domain resource;

Manner 6: the index of the random access preamble corresponding to the first frequency domain resource is mapped to the parameter corresponding to the second frequency domain resource;

Manner 7: the index of the random access preamble corresponding to the first frequency domain resource is mapped to the bandwidth of the second frequency domain resource;

Manner 8: the index of the random access preamble corresponding to the first frequency domain resource is mapped to the frequency domain location of the second frequency domain resource;

Manner 9: the parameter corresponding to the first frequency domain resource is mapped to the index of the second frequency domain resource;

Manner 10: the parameter corresponding to the first frequency domain resource is mapped to the parameter corresponding to the second frequency domain resource;

Manner 11: the parameter corresponding to the first frequency domain resource is mapped to the bandwidth of the second frequency domain resource;

Manner 12: the parameter corresponding to the first frequency domain resource is mapped to the frequency domain location of the second frequency domain resource;

Manner 13: a parameter corresponding to the random access preamble is mapped to the index of the second frequency domain resource;

Manner 14: the parameter corresponding to the random access preamble is mapped to the parameter corresponding to the second frequency domain resource;

Manner 15: the parameter corresponding to the random access preamble is mapped to the bandwidth of the second frequency domain resource;

Manner 16: the parameter corresponding to the random access preamble is mapped to the frequency domain location of the second frequency domain resource;

Manner 17: the bandwidth of the first frequency domain resource is mapped to the index of the second frequency domain resource;

Manner 18: the bandwidth of the first frequency domain resource is mapped to the parameter corresponding to the second frequency domain resource;

Manner 19: the bandwidth of the first frequency domain resource is mapped to the bandwidth of the second frequency domain resource;

Manner 20: the bandwidth of the first frequency domain resource is mapped to the frequency domain location of the second frequency domain resource;

Manner 21: the bandwidth of the random access preamble is mapped to the index of the second frequency domain resource;

Manner 22: the bandwidth of the random access preamble is mapped to the parameter corresponding to the second frequency domain resource;

Manner 23: the bandwidth of the random access preamble is mapped to the bandwidth of the second frequency domain resource;

Manner 24: the bandwidth of the random access preamble is mapped to the frequency domain location of the second frequency domain resource;

Manner 25: the frequency domain location of the first frequency domain resource is mapped to the index of the second frequency domain resource;

Manner 26: the frequency domain location of the first frequency domain resource is mapped to the parameter corresponding to the second frequency domain resource;

Manner 27: the frequency domain location of the first frequency domain resource is mapped to the bandwidth of the second frequency domain resource;

Manner 28: the frequency domain location of the first frequency domain resource is mapped to the frequency domain location of the second frequency domain resource;

Manner 29: the CP time length of the random access preamble is mapped to the index of the second frequency domain resource;

Manner 30: the CP time length of the random access preamble is mapped to the parameter corresponding to the second frequency domain resource;

Manner 31: the CP time length of the random access preamble is mapped to the bandwidth of the second frequency domain resource;

Manner 32: the CP time length of the random access preamble is mapped to the frequency domain location of the second frequency domain resource;

Manner 33: the sequence length of the random access preamble is mapped to the index of the second frequency domain resource;

Manner 34: the sequence length of the random access preamble is mapped to the parameter corresponding to the second frequency domain resource;

Manner 35: the sequence length of the random access preamble is mapped to the bandwidth of the second frequency domain resource; and Manner 36: the sequence length of the random access preamble is mapped to the frequency domain location of the second frequency domain resource.

In an optional design, the method further includes: sending, by the network device, second indication information to the terminal, where the second indication information is carried in a system information block, the second indication information is used to indicate a plurality of candidate second frequency domain resources, and the plurality of candidate second frequency domain resources include the second frequency domain resource.

In an optional design, the uplink physical channel information includes a random access message 3 and/or an acknowledgement of a random access message 4.

According to a third aspect, this application provides a terminal, configured to perform the method in the first aspect or any possible design of the first aspect. Specifically, the terminal includes a unit configured to perform the method in the first aspect or any possible design of the first aspect.

According to a fourth aspect, this application provides a network device, configured to perform the method in the second aspect or any possible design of the second aspect. Specifically, the network device includes a unit configured to perform the method in the second aspect or any possible design of the second aspect.

According to a fifth aspect, this application provides a terminal, including a transceiver, a processor, and a memory. The transceiver, the processor, and the memory may be connected by using a bus system. The memory is configured to store a program, an instruction, or code, and the processor is configured to execute the program, the instruction, or the code in the memory to complete the method in the first aspect or any possible design of the first aspect.

According to a sixth aspect, this application provides a network device, including a transceiver, a processor, and a memory. The transceiver, the processor, and the memory may be connected by using a bus system. The memory is configured to store a program, an instruction, or code, and the processor is configured to execute the program, the instruction, or the code in the memory to complete the method in the second aspect or any possible design of the second aspect.

According to a seventh aspect, this application provides a computer-readable storage medium, where the computer-readable storage medium stores an instruction, and when the instruction is run on a computer, the computer is enabled to perform the method in the first aspect or any possible design of the first aspect or the method in the second aspect or any possible design of the second aspect.

According to an eighth aspect, this application provides a communications system, including the terminal in the third aspect or the fifth aspect, and the network device in the fourth aspect or the sixth aspect.

DETAILED DESCRIPTION OF ILLUSTRATIVE EMBODIMENTS

Figure 1:
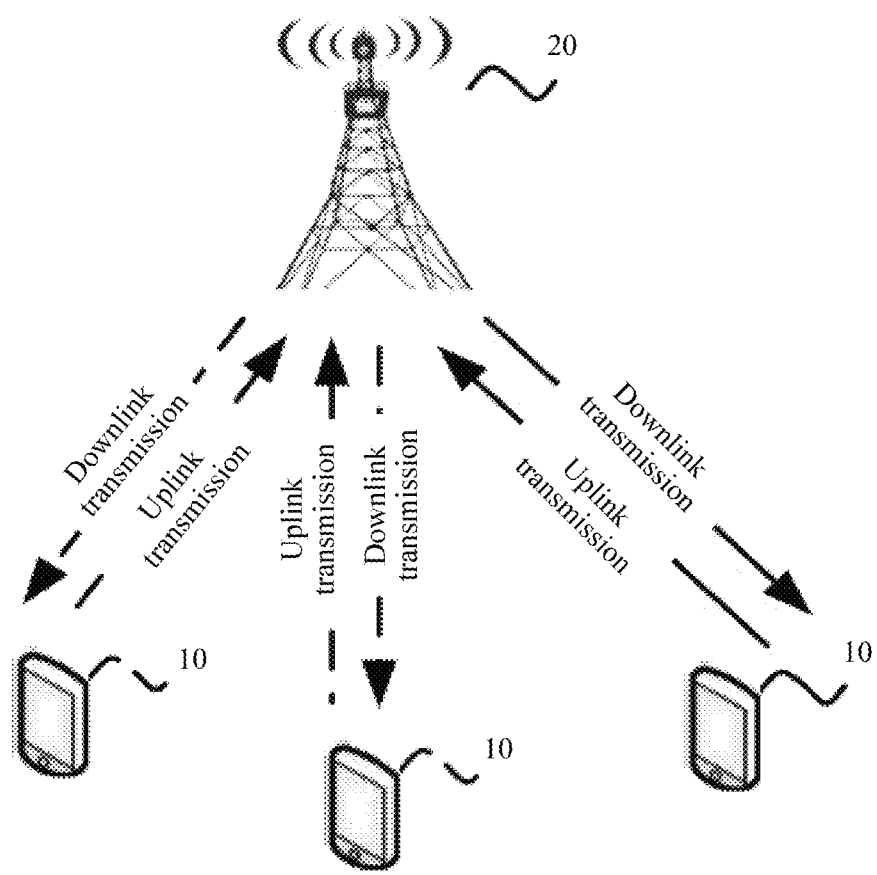
FIG. 1 is a schematic diagram of an application scenario according to an embodiment of this application.

Technical solutions of embodiments of this application may be applied to various communications systems, for example, an NR system, a Wireless Fidelity (WiFi) system, a Worldwide Interoperability for Microwave Access (WiMAX) system, a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, a Long Term Evolution Advanced (Advanced Long Term Evolution, or LTE-A) system, a Universal Mobile Telecommunication System (UMTS), a cellular system associated with the 3rd Generation Partnership Project (3GPP), and a fifth generation (5G) mobile communications system.

The following describes some terms in this application to facilitate understanding of a person skilled in the art.

(1) A "network device" described in this application may also be referred to as a radio access network device, and may be a gNB (gNodeB), may be a common base station (for example, a NodeB (NodeB, NB) in a WCDMA system, an evolved NodeB (Evolutional NodeB, eNB or eNodeB) in an LTE system, or a base transceiver station (BTS) in a GSM or CDMA system), may be a new radio controller (NR controller), may be a centralized unit, may be a new radio base station, may be a remote radio unit, may be a mobility management entity (MME), may be a micro base station, may be a distributed unit, may be a transmission reception point (TRP) or a transmission point (TP), or may be a radio controller in a cloud radio access network (CRAN) scenario. Alternatively, the network device may be a relay station, an access point, an in-vehicle device, a wearable device, a network device in a future 5G network, or a network device or any other wireless access device in a future evolved PLMN network. However, the embodiments of this application are not limited thereto.

(2) A "terminal" described in this application may be a wireless terminal or a wired terminal. A wireless terminal may be a device that provides a user with voice and/or data connectivity, a handheld device with a wireless connection function, or another processing device connected to a wireless modem. The wireless terminal may communicate with one or more core networks by using a radio access network (RAN). The wireless terminal may be a mobile terminal device such as a mobile phone (or referred to as a "cellular" phone) or a computer having a mobile terminal device. For example, the wireless terminal may be a portable, pocket-sized, handheld, computer built-in, or in-vehicle mobile apparatus that exchanges language and/or data with the radio access network. For example, the wireless terminal may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit (SU), a subscriber station (SS), a mobile station (MS), a mobile console (Mobile), a remote station (RS), an access point (AP), a remote terminal (RT), an access terminal (AT), a user terminal (UT), a user agent (UA), a user device (UD), or user equipment (UE). For ease of description, the terminal device and the UE are frequently alternately used in the embodiments of this application.

(3) A "carrier bandwidth part" described in this application is a part of a channel bandwidth, and may also be referred to as a "bandwidth part", an "operating bandwidth", or a transmission bandwidth. A mini BP, a BP unit, a BP sub-band, and the like may be referred to as a BP for short or a BWP for short. A name and an abbreviation of the carrier bandwidth part are not specifically limited in the embodiments of this application. The BP is a bandwidth first determined in two levels of resource allocation during data transmission. The BP may be a segment of continuous or discontinuous resources in a frequency domain. For example, one carrier bandwidth part includes K consecutive or non-consecutive subcarriers, where K>0. Alternatively, one carrier bandwidth part is a frequency domain resource on which N consecutive or non-consecutive resource blocks that do not overlap are located, where N>0. Alternatively, one carrier bandwidth part is a frequency domain resource on which M consecutive or non-consecutive resource block groups (RBG) that do not overlap are located, where M>0. One RBG includes P consecutive RBs, where P>0. One carrier bandwidth part is associated with one specific numerology set, and the numerology set includes at least one of a subcarrier spacing and a cyclic prefix (CP).

(4) A "numerology" described in this application is a series of physical layer parameters on an air interface. During specific implementation, optionally, one BP may be corresponding to one numerology. The numerology includes a subcarrier spacing, a time unit type, a cyclic prefix (CP) type, and the like. The subcarrier spacing is used as an example. If the terminal device supports a 15 KHz subcarrier spacing and a 30 KHz subcarrier spacing, the base station may allocate a BP with a 15 KHz subcarrier spacing and a BP with a 30 KHz subcarrier spacing to the terminal device. The terminal device may be handed over to different BPs based on different scenarios and service requirements, or may simultaneously transmit data on two or more BPs. When the terminal device supports a plurality of BPs, numerologies corresponding to the BPs may be the same, or may be different.

For ease of description, the "terminal", the "user equipment" and the "UE" are frequently alternately used in the embodiments of this application.

In addition, the term "and/or" in this specification describes only an association relationship for describing associated objects and represents that three relationships may exist. For example, A and/or B may represent the following three cases: Only A exists, both A and B exist, and only B exists.

Unless otherwise stated, ordinal numbers such as "first", "second", "third", "fourth", and "fifth" used in the embodiments of this application are used to distinguish between a plurality of objects, but are not intended to limit a sequence, a time sequence, a priority, or importance of the plurality of objects.

FIG. 1 is a schematic diagram of an application scenario according to this application. A communications system in FIG. 1 may include a terminal 10 and a network device 20. The network device 20 is configured to provide a communication service for the terminal 10 and access a core network, and the terminal 10 accesses a network by searching for a synchronization signal, a broadcast signal, and the like that are sent by the network device 20, to communicate with the network. An arrow shown in FIG. 1 may indicate uplink/downlink transmission performed by using a cellular link between the terminal 10 and the network device 20.

Figure 2:
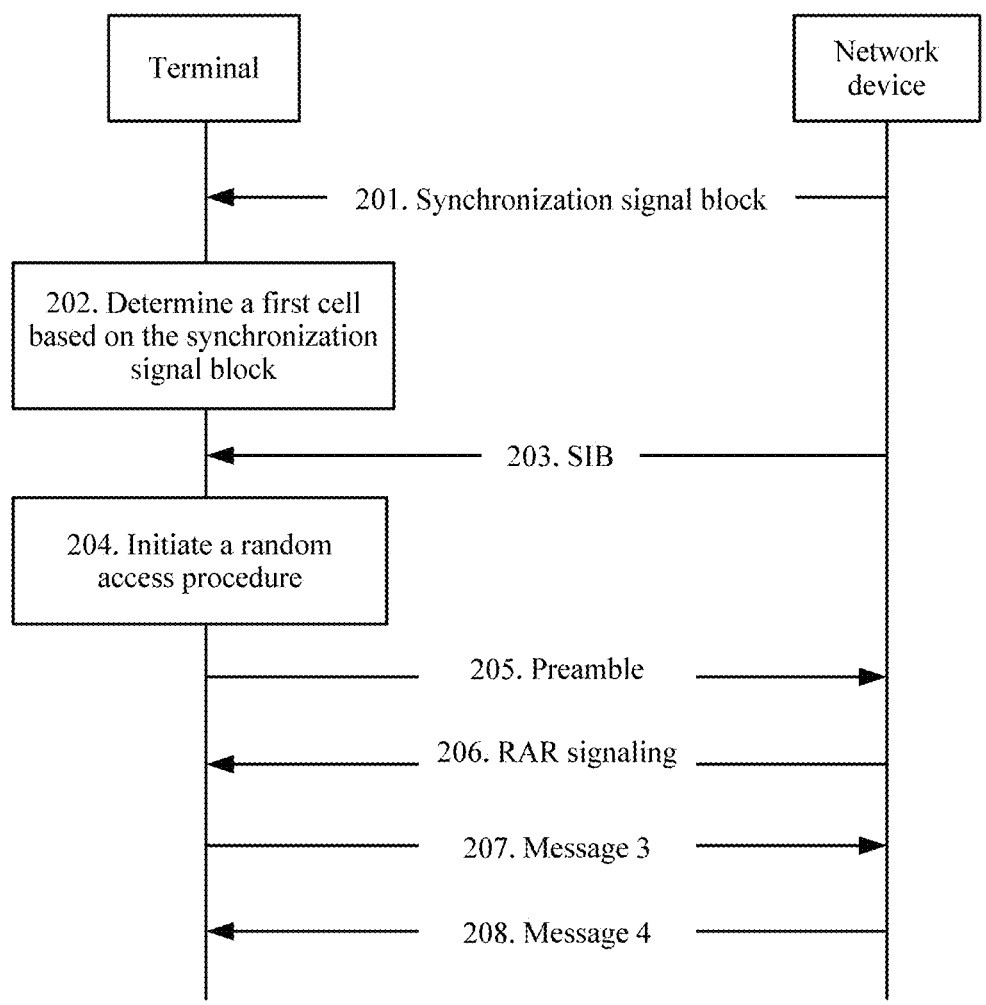
FIG. 2 is a schematic flowchart of a random access procedure.

FIG. 2 is a schematic flowchart of accessing a network device by a terminal. As shown in FIG. 2, a procedure of accessing the network device by the terminal (which is referred to as UE for short below for ease of description) mainly includes the following steps.

201. The network device periodically sends a synchronization signal block, where the synchronization signal block includes a primary synchronization signal (PSS) and a secondary synchronization signal (SSS).

202. The UE performs cell search, and selects a best cell for camping based on the synchronization signal block, where for ease of description, the "best cell" is indicated as a first cell. In addition, the UE can maintain time and frequency synchronization with the first cell based on the PSS and/or the SSS in the synchronization signal block. The UE obtains a master information block (MIB) of the synchronization information block, and a time-frequency domain resource of the MIB is predefined.

203. The UE obtains a system information block (SIB) sent by the first cell. A time domain resource of the SIB is predefined, and a frequency domain resource of the SIB is scheduled by using a downlink control channel.

204. After obtaining the MIB and the SIB, the UE initiates a random access procedure to establish a connection to the first cell, where when an access type is contention-based access, the access procedure includes steps 205, 206, 207, and 208, and when the access type is non-contention based access, the access procedure includes steps 205 and 206.

205. The UE sends a random access preamble to the network device on a physical random access channel (PRACH), where a resource of the random access preamble is indicated by using the SIB.

206. The network device blindly detects preambles on the PRACH, and if the network device detects the random access preamble, the network device reports the random access preamble to the Media Access Control (MAC), and subsequently feeds back random access response (RAR) signaling of the MAC on a physical downlink shared channel (PDSCH) within a random access response window.

207. The UE receives the RAR signaling, may obtain uplink synchronization based on a TA adjustment value in the RAR signaling, and transmits a message 3 (Msg3) on an uplink resource allocated by the network device to the UE. The Msg3 may carry a Radio Resource Control (RRC) connection request message, or may carry an RRC connection re-establishment request message.

208. The network device sends a message 4 (Msg4) to the UE. The network device and the UE finally complete contention resolution by using the Msg4.

In LTE, allocation of a resource of a carrier bandwidth part used by the UE needs to depend on a size of a system bandwidth. However, in a next-generation communications system, the UE may not know the size of the system bandwidth. Therefore, a method for determining a location of a frequency domain resource of an operating bandwidth without depending on a size of a system bandwidth urgently needs to be designed.

Figure 3:
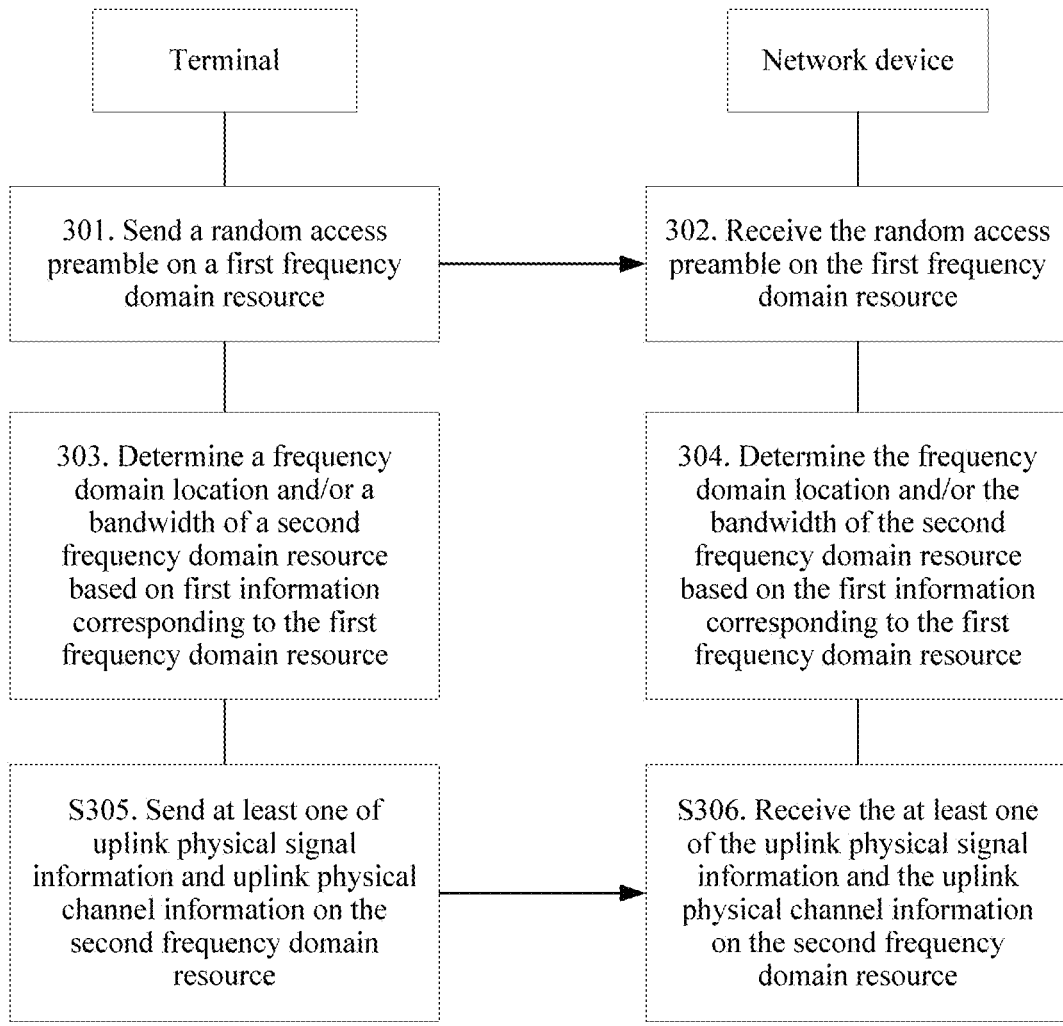
FIG. 3 is a schematic flowchart of a method according to an embodiment of this application.

FIG. 3 is a schematic flowchart of a resource allocation method 300 according to an embodiment of this application. The method 300 may be applied to the scenario shown in FIG. 1. The method 300 includes the following steps.

S301. A terminal sends a random access preamble to a network device on a first frequency domain resource.

Specifically, the first frequency domain resource is a physical random access channel frequency domain resource used by the terminal to send the random access preamble.

S302. The terminal determines a second frequency domain resource based on first information corresponding to the first frequency domain resource.

The terminal may determine a frequency domain location and/or a bandwidth of the second frequency domain resource based on the first information corresponding to the first frequency domain resource, and the second frequency domain resource may be a segment of continuous or discontinuous resources in a frequency domain. The first frequency domain resource and the second frequency domain resource are on a same carrier. The first information corresponding to the first frequency domain resource includes at least one of the following information: an index of the first frequency domain resource, frequency domain location information of the first frequency domain resource, a bandwidth of the first frequency domain resource, a parameter corresponding to the first frequency domain resource, an index of a random access preamble corresponding to the first frequency domain resource, a subcarrier spacing of the random access preamble, a bandwidth of the random access preamble, a cyclic prefix time length of the random access preamble, and a sequence length of the random access preamble.

The network device indicates, by using a SIB, one or more PRACH resources and a random access preamble (PRACH preamble) format corresponding to each PRACH resource. For example, the network device indicates three PRACH resources, namely, PRACH resources #1, #2, and #3, and a PRACH preamble format corresponding to each PRACH resource is shown in Table 1. It can be learned that one PRACH resource may be corresponding to one PRACH preamble format (for example, PRACH resources #2 and #3), or may be corresponding to a plurality of PRACH preamble formats (for example, a PRACH resource #1).

TABLE 1

Parameters corresponding to different PRACH preamble formats

| PRACH resource | No. | SCS (KHz) | BW (MHz) | $T_{CP}$ (Ts) | $T_{SEQ}$ (Ts) | $T_{GP}$ (Ts) |
|---|---|---|---|---|---|---|
| #1 | #1 | 1.25 | 1.08 | 3168 | 24576 | 2975 |
|  | #2 | 1.25 | 1.08 | 21024 | 2*24576 | 21904 |
| #2 | #2 | 1.25 | 1.08 | 21024 | 2*24576 | 21904 |
| #3 | #3 | 5 | 4.32 | 3168 | 4*6144 | 2976 |
|  |  | . . . |  |  |  |  |

The network device sends a system information block (SIB) to indicate a plurality of uplink frequency domain resources, namely, a plurality of second frequency domain resources such as second frequency domain resources #1, #2, and #3. The second frequency domain resource includes at least one of a frequency domain location, a bandwidth, and a parameter.

S303. The network device receives, on the first frequency domain resource, the random access preamble sent by the terminal.

The first frequency domain resource is a physical random access channel frequency domain resource used by the terminal to send the random access preamble.

S304. The terminal sends at least one of uplink physical signal information and uplink physical channel information on the second frequency domain resource.

The uplink physical channel information includes a random access message 3 and/or an acknowledgement of a random access message 4.

S305. The network device determines the second frequency domain resource based on the first information corresponding to the first frequency domain resource.

In this application, the second frequency domain resource in the method 300 may also be referred to as a carrier bandwidth part, an operating bandwidth, an uplink carrier bandwidth part, an uplink frequency domain resource, an uplink bandwidth part, or an uplink operating bandwidth.

S306. The network device receives, on the second frequency domain resource, the at least one of the uplink physical signal information and the uplink physical channel information sent by the terminal.

It should be noted that a sequence of performing S303 and S304 is not limited in this application.

In this application, the terminal and the network device determine the second frequency domain resource respectively by sending and receiving a PRACH resource of the random access preamble, and send or receive data on the second frequency domain resource. In this way, the terminal may determine one of a plurality of second frequency domain resources for use based on a service requirement and/or a network environment, thereby reducing resource configuration signaling overheads.

Optionally, in a specific embodiment, that the terminal determines a second frequency domain resource based on first information corresponding to the first frequency domain resource in S302 specifically includes: determining, by the terminal, the second frequency domain resource based on a first mapping manner between the first information corresponding to the first frequency domain resource and second information corresponding to the second frequency domain resource. That the network device determines the second frequency domain resource based on the first information corresponding to the first frequency domain resource in S305 specifically includes: determining, by the network device, the second frequency domain resource based on the first mapping manner between the first information corresponding to the first frequency domain resource and the second information corresponding to the second frequency domain resource. In a specific implementation, the first information corresponding to the first frequency domain resource includes at least one of transmission information corresponding to the first frequency domain resource and format information of the random access preamble corresponding to the first frequency domain resource. The transmission information corresponding to the first frequency domain resource includes at least one of an index of the first frequency domain resource, frequency domain location information of the first frequency domain resource, a bandwidth of the first frequency domain resource, and a parameter corresponding to the first frequency domain resource. The second information corresponding to the second frequency domain resource includes at least one of an index of the second frequency domain resource, frequency domain location information of the second frequency domain resource, a bandwidth of the second frequency domain resource, and a parameter corresponding to the second frequency domain resource. The format information of the random access preamble includes at least one of an index of the random access preamble, a subcarrier spacing of the random access preamble, a bandwidth of the random access preamble, a CP time length of the random access preamble, and a sequence time length of the random access preamble. For how to specifically determine the second frequency domain resource based on the first mapping manner, refer to the following specific description.

Optionally, the first mapping manner is one of a plurality of first mapping manners, and the plurality of first mapping manners include at least one of the following manners:

Manner 1: the index of the first frequency domain resource is mapped to the index of the second frequency domain resource;

Manner 2: the index of the first frequency domain resource is mapped to the parameter corresponding to the second frequency domain resource;

Manner 3: the index of the first frequency domain resource is mapped to the bandwidth of the second frequency domain resource;

Manner 4: the index of the first frequency domain resource is mapped to the frequency domain location of the second frequency domain resource;

Manner 5: the index of the random access preamble corresponding to the first frequency domain resource is mapped to the index of the second frequency domain resource;

Manner 6: the index of the random access preamble corresponding to the first frequency domain resource is mapped to the parameter corresponding to the second frequency domain resource;

Manner 7: the index of the random access preamble corresponding to the first frequency domain resource is mapped to the bandwidth of the second frequency domain resource;

Manner 8: the index of the random access preamble corresponding to the first frequency domain resource is mapped to the frequency domain location of the second frequency domain resource;

Manner 9: the parameter corresponding to the first frequency domain resource is mapped to the index of the second frequency domain resource;

Manner 10: the parameter corresponding to the first frequency domain resource is mapped to the parameter corresponding to the second frequency domain resource;

Manner 11: the parameter corresponding to the first frequency domain resource is mapped to the bandwidth of the second frequency domain resource;

Manner 12: the parameter corresponding to the first frequency domain resource is mapped to the frequency domain location of the second frequency domain resource;

Manner 13: a parameter corresponding to the random access preamble is mapped to the index of the second frequency domain resource;

Manner 14: the parameter corresponding to the random access preamble is mapped to the parameter corresponding to the second frequency domain resource;

Manner 15: the parameter corresponding to the random access preamble is mapped to the bandwidth of the second frequency domain resource;

Manner 16: the parameter corresponding to the random access preamble is mapped to the frequency domain location of the second frequency domain resource;

Manner 17: the bandwidth of the first frequency domain resource is mapped to the index of the second frequency domain resource;

Manner 18: the bandwidth of the first frequency domain resource is mapped to the parameter corresponding to the second frequency domain resource;

Manner 19: the bandwidth of the first frequency domain resource is mapped to the bandwidth of the second frequency domain resource;

Manner 20: the bandwidth of the first frequency domain resource is mapped to the frequency domain location of the second frequency domain resource;

Manner 21: the bandwidth of the random access preamble is mapped to the index of the second frequency domain resource;

Manner 22: the bandwidth of the random access preamble is mapped to the parameter corresponding to the second frequency domain resource;

Manner 23: the bandwidth of the random access preamble is mapped to the bandwidth of the second frequency domain resource;

Manner 24: the bandwidth of the random access preamble is mapped to the frequency domain location of the second frequency domain resource;

Manner 25: the frequency domain location of the first frequency domain resource is mapped to the index of the second frequency domain resource;

Manner 26: the frequency domain location of the first frequency domain resource is mapped to the parameter corresponding to the second frequency domain resource;

Manner 27: the frequency domain location of the first frequency domain resource is mapped to the bandwidth of the second frequency domain resource;

Manner 28: the frequency domain location of the first frequency domain resource is mapped to the frequency domain location of the second frequency domain resource;

Manner 29: the CP time length of the random access preamble is mapped to the index of the second frequency domain resource;

Manner 30: the CP time length of the random access preamble is mapped to the parameter corresponding to the second frequency domain resource;

Manner 31: the CP time length of the random access preamble is mapped to the bandwidth of the second frequency domain resource;

Manner 32: the CP time length of the random access preamble is mapped to the frequency domain location of the second frequency domain resource;

Manner 33: the sequence length of the random access preamble is mapped to the index of the second frequency domain resource;

Manner 34: the sequence length of the random access preamble is mapped to the parameter corresponding to the second frequency domain resource;

Manner 35: the sequence length of the random access preamble is mapped to the bandwidth of the second frequency domain resource; and Manner 36: the sequence length of the random access preamble is mapped to the frequency domain location of the second frequency domain resource.

How to determine the second frequency domain resource based on the first mapping manner is described below by using an example.

For example, when there are a plurality of second frequency domain resources, any two second frequency domain resources are different in all of an index, a bandwidth, a frequency domain location, and/or a corresponding parameter. In other words, each second frequency domain resource is corresponding to a specific index, bandwidth, frequency domain location, and/or parameter. For example, there are two second frequency domain resources that are respectively a second frequency domain resource A and a second frequency domain resource B. The second frequency domain resource A is corresponding to an index A, a bandwidth A, a frequency domain location A, and a parameter A, and the second frequency domain resource B is corresponding to an index B, a bandwidth B, a frequency domain location B, and a parameter B. The index A is different from the index B, the bandwidth A is different from the bandwidth B, the frequency domain location A is different from the frequency domain location B, and the parameter A is different from the parameter B. Therefore, the second frequency domain resource may be uniquely determined based on any one of the foregoing first mapping manners.

For example, when there are a plurality of second frequency domain resources, any two second frequency domain resources are different in at least one of an index, a bandwidth, a frequency domain location, and a corresponding parameter. For example, a second frequency domain resource A is corresponding to an index A, a bandwidth A, a frequency domain location A, and a parameter A, and a second frequency domain resource B is corresponding to an index B, the bandwidth A, a frequency domain location B, and the parameter A. Therefore, for example, the second frequency domain resource A may be determined based on mapping between the index of the first frequency domain resource and the index of the second frequency domain resource, to determine the bandwidth and the frequency domain location of the second frequency domain resource A. Alternatively, the second frequency domain resource may be determined based on mapping between the index of the first frequency domain resource and the frequency domain location of the second frequency domain resource, to determine the bandwidth and the frequency domain location of the second frequency domain resource B.

A person skilled in the art may understand that only how to determine the second frequency domain resource based on the first mapping manner is described above by using an example. A person skilled in the art may know, based on understanding of this application, how to determine the second frequency domain resource based on a combination of different manners of the first mapping manner, and this belongs to this application. How to determine the second frequency domain resource based on another manner included in the first mapping manner is not described in this application.

Optionally, the first mapping manner may be preset. In this way, after determining the first frequency domain resource, the terminal may determine the second frequency domain resource based on the preset first mapping manner.

Optionally, the terminal may receive first indication information sent by the network device, and the first indication information is used to indicate the mapping manner. In this way, the network device may flexibly indicate the mapping manner, thereby improving resource allocation flexibility.

Optionally, the first indication information is carried in a system information block.

Optionally, the terminal may receive second indication information sent by the network device. The second indication information is carried in a system information block, and is used to indicate a plurality of candidate second frequency domain resources, and the plurality of candidate second frequency domain resources include the second frequency domain resource.

Optionally, the terminal may determine at least one of the following information based on the second indication information: an index of at least one candidate second frequency domain resource, a parameter corresponding to the at least one candidate second frequency domain resource, a frequency domain location of the at least one candidate second frequency domain resource, and a bandwidth of the at least one candidate second frequency domain resource. It can be understood that the index of the at least one candidate second frequency domain resource is an index of each candidate second frequency domain resource included in the at least one candidate second frequency domain resource; the parameter corresponding to the at least one candidate second frequency domain resource is a parameter corresponding to each candidate second frequency domain resource included in the at least one candidate second frequency domain resource; the frequency domain location of the at least one candidate second frequency domain resource is a frequency domain location of each candidate second frequency domain resource included in the at least one candidate second frequency domain resource; and the bandwidth of the at least one candidate second frequency domain resource is a bandwidth of each candidate second frequency domain resource included in the at least one candidate second frequency domain resource.

Optionally, the frequency domain location information of the first frequency domain resource may be a start location, a central location, or an end location of the first frequency domain resource. Certainly, the frequency domain location information of the first frequency domain resource may be any location of the first frequency domain resource. This is not limited in this application. The terminal may determine a second location of the second frequency domain resource based on a first location of the first frequency domain resource and an offset between the first location and the second location, and determine the second frequency domain resource based on the second location and the bandwidth of the second frequency domain resource. The network device may determine a second location of the second frequency domain resource based on a first location of the first frequency domain resource and an offset between the first location and the second location, and determine the second frequency domain resource based on the second location and the bandwidth of the second frequency domain resource.

It should be understood that the start location of the first frequency domain resource may be a resource block (RB) with a minimum index or a resource block group (RBG) with a minimum index in the first frequency domain resource, and correspondingly, the end location is an RB with a maximum index or an RBG with a maximum index in the first frequency domain resource. Alternatively, the start location of the first frequency domain resource may be an RB with a maximum index or an RBG with a maximum index in the first frequency domain resource, and correspondingly, the end location is an RB with a minimum index or an RBG with a minimum index in the first frequency domain resource. For ease of description, the following embodiment is described by using an example in which the start location is the RB with a minimum index or the RBG with a minimum index.

The terminal and the network device may preset the offset between the first location of the first frequency domain resource and the second location. In this way, when determining the first location, the terminal may determine the second location of the second frequency domain resource based on the offset between the first location and the second location.

Optionally, the offset between the first location and the second location may be an offset value and an offset direction between the first location and the second location.

Optionally, a granularity of the offset value may be an RB, a PBG, a subcarrier, a sub-bandwidth, or the like.

Specifically, the granularity of the offset value may be a unit used when the offset value between the first location and the second location is calculated. For example, a second location of a first carrier bandwidth part is a location obtained by moving upwardly or downwardly the first location of the first frequency domain resource by two RBs. In this case, the granularity of the offset value is the RB.

Optionally, the second location may be corresponding to the first location. For example, if the first location is the start location of the first frequency domain resource, the second location is a start location of the carrier bandwidth part. If the first location is the central location of the first frequency domain resource, the second location is a central location of the carrier bandwidth part. If the first location is the end location of the first frequency domain resource, the second location is an end location of the carrier bandwidth part. Alternatively, the second location is not corresponding to the first location. For example, if the first location is the start location of the first frequency domain resource, the second location is an end location or a central location of the carrier bandwidth part. This is not limited in this application.

Optionally, the terminal may receive third indication information sent by the network device, and the third indication information is used to indicate the offset between the first location of the first frequency domain resource and the second location of the carrier bandwidth part. In this way, the network device may flexibly indicate the offset of the second location relative to the first location, and the user equipment determines the second location of the carrier bandwidth part based on the third indication information, thereby improving resource allocation flexibility.

Optionally, the third indication information sent by the network device and received by the user equipment may be carried in a master information block, or may be carried in a system information block. This is not limited in this application.

It should be noted that the master information block in this embodiment of this application may be a master information block in LTE, for example, the MIB obtained in step 202 in FIG. 2. A name of the master information block is not limited in this application. The system information block may also be a system information block in LTE, for example, the SIB obtained in step 203 in FIG. 2.

It should be noted that a method for selecting a PRACH resource and/or a PRACH preamble format by the terminal includes but is not limited to: if PRACH preamble formats corresponding to a plurality of PRACH resources in a network are the same, the terminal device randomly selects a PRACH resource to send the PRACH preamble. If PRACH preamble formats corresponding to a plurality of PRACH resources in a network are different, the terminal may select a PRACH preamble format and a corresponding PRACH resource based on a requirement and/or a network environment. For example, a fast-moving terminal device (corresponding to a relatively large Doppler shift) selects a PRACH preamble format with a relatively large subcarrier spacing, for example, a PRACH preamble format corresponding to a PRACH resource 3. A terminal device at a cell edge (corresponding to a relatively large downlink path loss) selects a PRACH preamble format that is repeated more times, for example, a PRACH preamble format corresponding to a PRACH resource 2. Further, the terminal device determines the frequency domain resource of the uplink carrier bandwidth part based on the selected PRACH resource.

Optionally, in a specific embodiment, that the terminal determines a second frequency domain resource based on the first frequency domain resource in S301 specifically includes: determining, by the terminal device, the second frequency domain resource based on a second mapping manner between the first information corresponding to the first frequency domain resource and third information corresponding to a third frequency domain resource and a third mapping manner between the third information corresponding to the third frequency domain resource and the second information corresponding to the second frequency domain resource. That the network device determines the second frequency domain resource based on the first frequency domain resource in S303 specifically includes: determining, by the network device, the second frequency domain resource based on the second mapping manner between the first information corresponding to the first frequency domain resource and the third information corresponding to the third frequency domain resource and the third mapping manner between the third information corresponding to the third frequency domain resource and the second information corresponding to the second frequency domain resource. Optionally, the third frequency domain resource is a frequency domain resource used by the network device to send a random access response or a control channel resource used by the network device to schedule the random access response, and the third information corresponding to the third frequency domain resource includes at least one of the following information: an index of the third frequency domain resource, a parameter corresponding to the third frequency domain resource, a bandwidth corresponding to the third frequency domain resource, and frequency domain location information corresponding to the third frequency domain resource.

Optionally, the second mapping manner is one of a plurality of second mapping manners, and the plurality of second mapping manners include at least one of the following manners:

Manner 1: the index of the first frequency domain resource is mapped to the index of the third frequency domain resource;

Manner 2: the index of the first frequency domain resource is mapped to the parameter corresponding to the third frequency domain resource;

Manner 3: the index of the first frequency domain resource is mapped to the bandwidth of the third frequency domain resource;

Manner 4: the index of the first frequency domain resource is mapped to the frequency domain location of the third frequency domain resource;

Manner 5: the index of the random access preamble corresponding to the first frequency domain resource is mapped to the index of the third frequency domain resource;

Manner 6: the index of the random access preamble corresponding to the first frequency domain resource is mapped to the parameter corresponding to the third frequency domain resource;

Manner 7: the index of the random access preamble corresponding to the first frequency domain resource is mapped to the bandwidth of the third frequency domain resource;

Manner 8: the index of the random access preamble corresponding to the first frequency domain resource is mapped to the frequency domain location of the third frequency domain resource;

Manner 9: the parameter corresponding to the first frequency domain resource is mapped to the index of the third frequency domain resource;

Manner 10: the parameter corresponding to the first frequency domain resource is mapped to the parameter corresponding to the third frequency domain resource;

Manner 11: the parameter corresponding to the first frequency domain resource is mapped to the bandwidth of the third frequency domain resource;

Manner 12: the parameter corresponding to the first frequency domain resource is mapped to the frequency domain location of the third frequency domain resource;

Manner 13: a parameter corresponding to the random access preamble is mapped to the index of the third frequency domain resource;

Manner 14: the parameter corresponding to the random access preamble is mapped to the parameter corresponding to the third frequency domain resource;

Manner 15: the parameter corresponding to the random access preamble is mapped to the bandwidth of the third frequency domain resource;

Manner 16: the parameter corresponding to the random access preamble is mapped to the frequency domain location of the third frequency domain resource;

Manner 17: the bandwidth of the first frequency domain resource is mapped to the index of the third frequency domain resource;

Manner 18: the bandwidth of the first frequency domain resource is mapped to the parameter corresponding to the third frequency domain resource;

Manner 19: the bandwidth of the first frequency domain resource is mapped to the bandwidth of the third frequency domain resource;

Manner 20: the bandwidth of the first frequency domain resource is mapped to the frequency domain location of the third frequency domain resource;

Manner 21: the bandwidth of the random access preamble is mapped to the index of the third frequency domain resource;

Manner 22: the bandwidth of the random access preamble is mapped to the parameter corresponding to the third frequency domain resource;

Manner 23: the bandwidth of the random access preamble is mapped to the bandwidth of the third frequency domain resource;

Manner 24: the bandwidth of the random access preamble is mapped to the frequency domain location of the third frequency domain resource;

Manner 25: the frequency domain location of the first frequency domain resource is mapped to the index of the third frequency domain resource;

Manner 26: the frequency domain location of the first frequency domain resource is mapped to the parameter corresponding to the third frequency domain resource;

Manner 27: the frequency domain location of the first frequency domain resource is mapped to the bandwidth of the third frequency domain resource;

Manner 28: the frequency domain location of the first frequency domain resource is mapped to the frequency domain location of the third frequency domain resource;

Manner 29: the CP time length of the random access preamble is mapped to the index of the third frequency domain resource;

Manner 30: the CP time length of the random access preamble is mapped to the parameter corresponding to the third frequency domain resource;

Manner 31: the CP time length of the random access preamble is mapped to the bandwidth of the third frequency domain resource;

Manner 32: the CP time length of the random access preamble is mapped to the frequency domain location of the third frequency domain resource;

Manner 33: the sequence length of the random access preamble is mapped to the index of the third frequency domain resource;

Manner 34: the sequence length of the random access preamble is mapped to the parameter corresponding to the third frequency domain resource;

Manner 35: the sequence length of the random access preamble is mapped to the bandwidth of the third frequency domain resource; and Manner 36: the sequence length of the random access preamble is mapped to the frequency domain location of the third frequency domain resource.

Optionally, the third mapping manner is one of a plurality of third mapping manners, and the plurality of third mapping manners include at least one of the following manners:

Manner 1: the index of the third frequency domain resource is mapped to the index of the second frequency domain resource;

Manner 2: the index of the third frequency domain resource is mapped to the parameter corresponding to the second frequency domain resource;

Manner 3: the index of the third frequency domain resource is mapped to the bandwidth of the second frequency domain resource;

Manner 4: the index of the third frequency domain resource is mapped to the frequency domain location of the second frequency domain resource;

Manner 5: the parameter corresponding to the third frequency domain resource is mapped to the index of the second frequency domain resource;

Manner 6: the parameter corresponding to the third frequency domain resource is mapped to the parameter corresponding to the second frequency domain resource;

Manner 7: the parameter corresponding to the third frequency domain resource is mapped to the bandwidth of the second frequency domain resource;

Manner 8: the parameter corresponding to the third frequency domain resource is mapped to the frequency domain location of the second frequency domain resource;

Manner 9: the bandwidth of the third frequency domain resource is mapped to the index of the second frequency domain resource;

Manner 10: the bandwidth of the third frequency domain resource is mapped to the parameter corresponding to the second frequency domain resource;

Manner 11: the bandwidth of the third frequency domain resource is mapped to the bandwidth of the second frequency domain resource;

Manner 12: the bandwidth of the third frequency domain resource is mapped to the frequency domain location of the second frequency domain resource;

Manner 13: The frequency domain location of the third frequency domain resource is mapped to the index of the second frequency domain resource;

Manner 14: the frequency domain location of the third frequency domain resource is mapped to the parameter corresponding to the second frequency domain resource;

Manner 15: the frequency domain location of the third frequency domain resource is mapped to the bandwidth of the second frequency domain resource; and Manner 16: the frequency domain location of the third frequency domain resource is mapped to the frequency domain location of the second frequency domain resource.

For example, the network device configures at least two random access response resources 1 and 2 by using the SIB. For example, the two random access response resources 1 and 2 are corresponding to different indexes, parameters, and/or bandwidths. The second mapping manner includes: a first frequency domain resource whose index, parameter, and/or bandwidth is 1 is mapped to the random access response resource 1, and a first frequency domain resource whose index, parameter, and/or bandwidth is 2 is mapped to the random access response resource 2. The third mapping manner includes: the random access response resource 1 is mapped to a second frequency domain resource whose index, parameter, and/or bandwidth is 2, and the random access response resource 2 is mapped to a second frequency domain resource whose index, parameter, and/or bandwidth is 1. A terminal 1 that sends the random access preamble on the first frequency domain resource whose index, parameter, and/or bandwidth is 1 receives the random access response on the random access response resource 1, and then sends the uplink physical signal information and/or the uplink physical channel information on the second frequency domain resource whose index, parameter, and/or bandwidth is 2. A terminal 2 that sends the random access preamble on the first frequency domain resource whose index, parameter, and/or bandwidth is 2 receives the random access response on the random access response resource 2, and then sends the uplink physical signal information and/or the uplink physical channel information on the second frequency domain resource whose index, parameter, and/or bandwidth is 1.

For another example, the base station configures at least two random access response control channel resources by using the SIB, including a random access response control channel resource 1 whose bandwidth is 20 MHz and a random access response control channel resource 2 whose bandwidth is 50 MHz. The second mapping manner includes: the first frequency domain resource whose index, parameter, and/or bandwidth is 1 is mapped to the random access response control channel resource 1, and the first frequency domain resource whose index, parameter, and/or bandwidth is 2 is mapped to the random access response resource 2. The third mapping manner includes: the random access response control channel resource 1 is mapped to the second frequency domain resource whose index, parameter, and/or bandwidth is 2, and the random access response resource 2 is mapped to the second frequency domain resource whose index, parameter, and/or bandwidth is 1. The terminal 1 that sends an initial access preamble on the first frequency domain resource whose index, parameter, and/or bandwidth is 1 receives random access response scheduling information on the random access response control channel resource 1 whose bandwidth is 20 MHz, determines a resource on which the random access response is located, receives the random access response, and sends the uplink physical signal information and/or the uplink physical channel information on the second frequency domain resource whose index, parameter, and/or bandwidth is 2. The terminal 2 that sends an initial access preamble on the first frequency domain resource whose index, parameter, and/or bandwidth is 2 receives random access response scheduling information on the random access response control channel resource 2 whose bandwidth is 50 MHz, determines a resource on which the random access response is located, receives the random access response, and sends the uplink physical signal information and/or the uplink physical channel information on the second frequency domain resource whose index, parameter, and/or bandwidth is 1.

It should be noted that the foregoing Arabic numerals "1" and "2" are merely used to distinguish between different objects, but are not used to identify a value of the index, the parameter and/or the bandwidth as 1 or 2.

It should be further noted that a plurality of manners of the first mapping manner, the second mapping manner, and the third mapping manner in this application are merely examples, and should not be construed as a limitation on this application. How to determine the second frequency domain resource based on the second mapping manner and the third mapping manner is similar to the foregoing description of determining the second frequency domain resource by using the first mapping manner. Details are not described herein again.

According to the foregoing method provided in this application, a terminal supporting different capabilities and/or requirements can determine a target second frequency domain resource from a plurality of candidate second frequency domain resources, thereby effectively reducing signaling overheads, and implementing flexible resource allocation.

Figure 4:
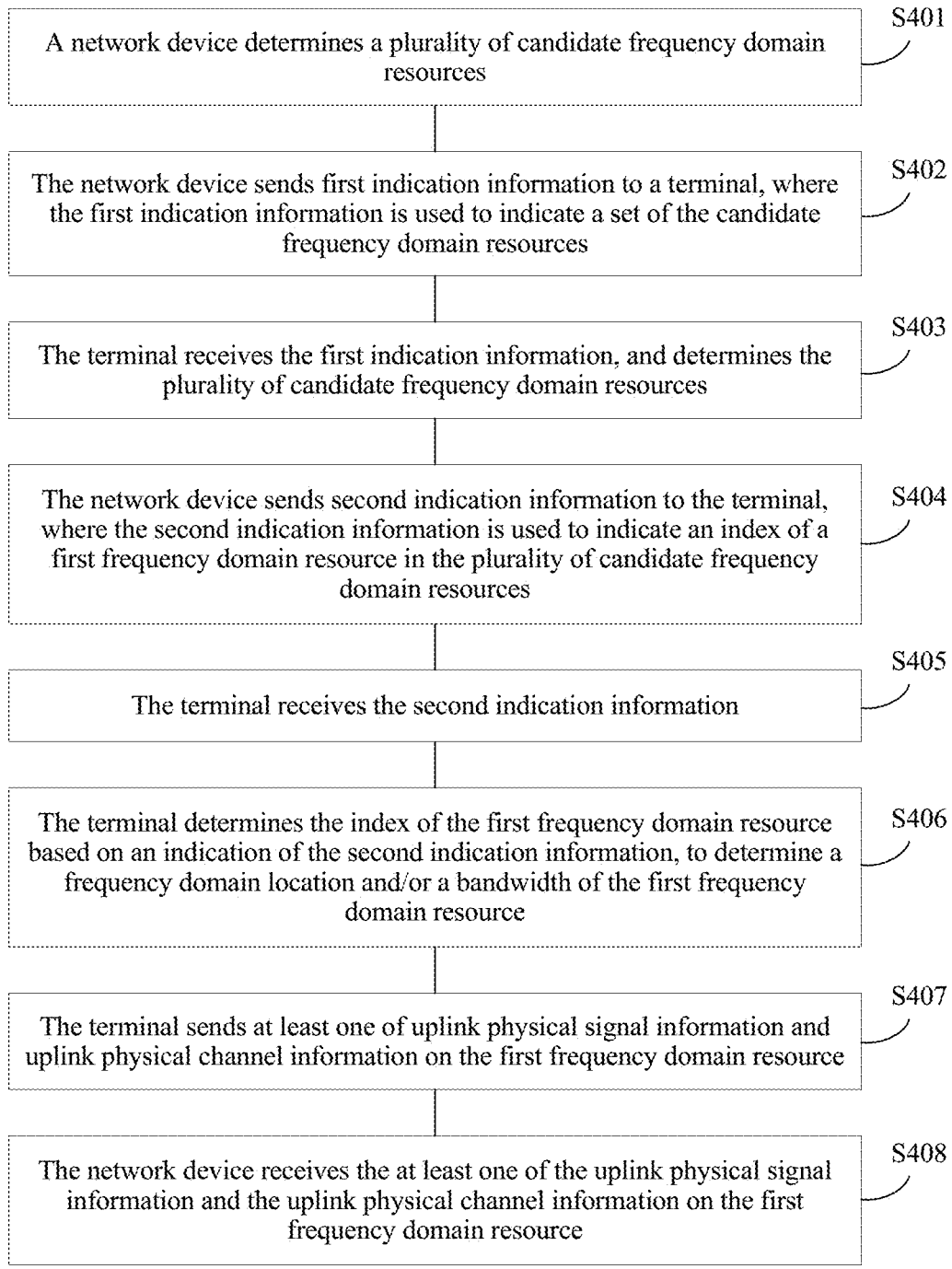
FIG. 4 is a schematic flowchart of another method according to an embodiment of this application.

FIG. 4 is a schematic flowchart of another resource allocation method 400 according to an embodiment of this application. The method 400 may be applied to the scenario shown in FIG. 1. The method 400 includes the following steps:

S401. A network device determines a plurality of candidate frequency domain resources.

S402. The network device sends first indication information to a terminal, where the first indication information is used to indicate a set of candidate frequency domain resources, and the first indication information is carried in a system information block.

S403. The terminal receives the first indication information sent by the network device, and determines the plurality of candidate frequency domain resources.

S404. The network device sends second indication information to the terminal, where the second indication information is used to indicate an index of a first frequency domain resource in the plurality of candidate frequency domain resources, and the second indication information is carried in random access response signaling.

S405. The terminal receives the second indication information sent by the network device.

S406. The terminal determines the index of the first frequency domain resource based on the second indication information, to determine the first frequency domain resource based on the index of the first frequency domain resource.

S407. The terminal sends at least one of uplink physical signal information and uplink physical channel information on the first frequency domain resource.

S408. The network device receives, on the first frequency domain resource, the at least one of the uplink physical signal information and the uplink physical channel information sent by the terminal.

Optionally, the uplink physical channel information includes a random access message 3 and/or an acknowledgement of a random access message 4, and the acknowledgement includes a positive acknowledgement ACK or a negative acknowledgement NACK.

In this application, the first frequency domain resource in the method 400 may also be referred to as a carrier bandwidth part, an operating bandwidth, an uplink carrier bandwidth part, an uplink frequency domain resource, an uplink bandwidth part, or an uplink operating bandwidth.

According to the foregoing method, the index of the first frequency domain resource that can be used by the terminal is carried in the RAR signaling, so that resource allocation of the uplink carrier bandwidth part is implemented, thereby effectively reducing resource configuration signaling overheads.

Apparatuses corresponding to the foregoing method embodiments are described below with reference to the accompanying drawings.

Figure 5:
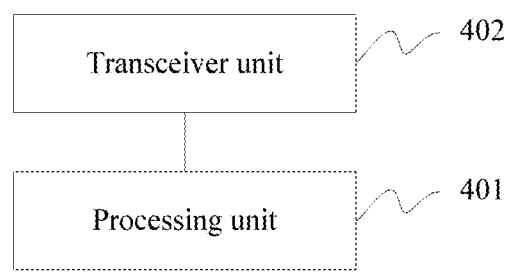
FIG. 5 is a schematic diagram of a network device according to an embodiment of this application.

FIG. 5 is a schematic diagram of a network device 400 according to an embodiment. The network device 400 may be applied to the scenario shown in FIG. 1, and is configured to perform the method corresponding to FIG. 3 or FIG. 4. As shown in FIG. 5, the network device 400 includes a processing unit 401 and a transceiver unit 402. The transceiver unit 402 may be specifically configured to perform information receiving and sending performed by the network device in the method 300 or the method 400. The processing unit 401 is specifically configured to perform processing other than information receiving and sending performed by the network device in the method 300 or the method 400.

For example, in the method 300, the transceiver unit 402 is configured to receive, on a first frequency domain resource, a random access preamble sent by a terminal, and the first frequency domain resource is a physical random access channel frequency domain resource used by the terminal to send the random access preamble. The processing unit is configured to determine a second frequency domain resource based on the first frequency domain resource, and the first frequency domain resource and the second frequency domain resource are on a same carrier. The transceiver unit 402 is further configured to receive at least one of uplink physical signal information and uplink physical channel information from the terminal on the second frequency domain resource.

For another example, in the method 400, the transceiver unit 402 sends the first indication information and the second indication information to a terminal, and receives, on the first frequency domain resource, at least one of uplink physical signal information and uplink physical channel information sent by the terminal. The processing unit 401 is configured to determine a set of the candidate resource units. Optionally, the processing unit 401 is further configured to process the received uplink physical signal information and/or uplink physical channel information.

For specific content, refer to related descriptions in the method 300 or the method 400. Details are not described herein again.

Figure 6:
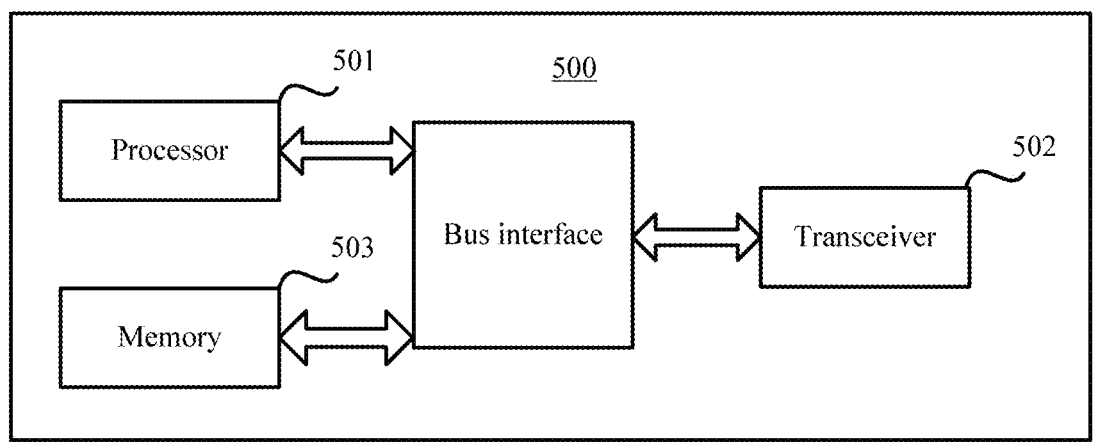
FIG. 6 is a schematic diagram of a network device according to an embodiment of this application.

It should be understood that division of the foregoing units is merely a logical function division. During actual implementation, all or some of the units may be integrated into one physical entity, or may be physically separated. In this embodiment of this application, the transceiver unit 402 may be implemented by a transceiver, and the processing unit 401 may be implemented by a processor. As shown in FIG. 6, a network device 500 may include a processor 501, a transceiver 502, and a memory 503. The memory 503 may be configured to store a program/code that is pre-installed when the network device 500 is delivered from a factory, may store code executed by the processor 501, or the like.

It should be understood that the network device 500 according to this embodiment of this application may be corresponding to the network device in the method 300 or the method 400 according to the embodiment of this application. The transceiver 502 is configured to perform information receiving and sending performed by the network device in the method 300 or the method 400, and the processor 501 is configured to perform processing other than information receiving and sending performed by the network device in the method 300 or the method 400. Details are not described herein again.

Figure 7:
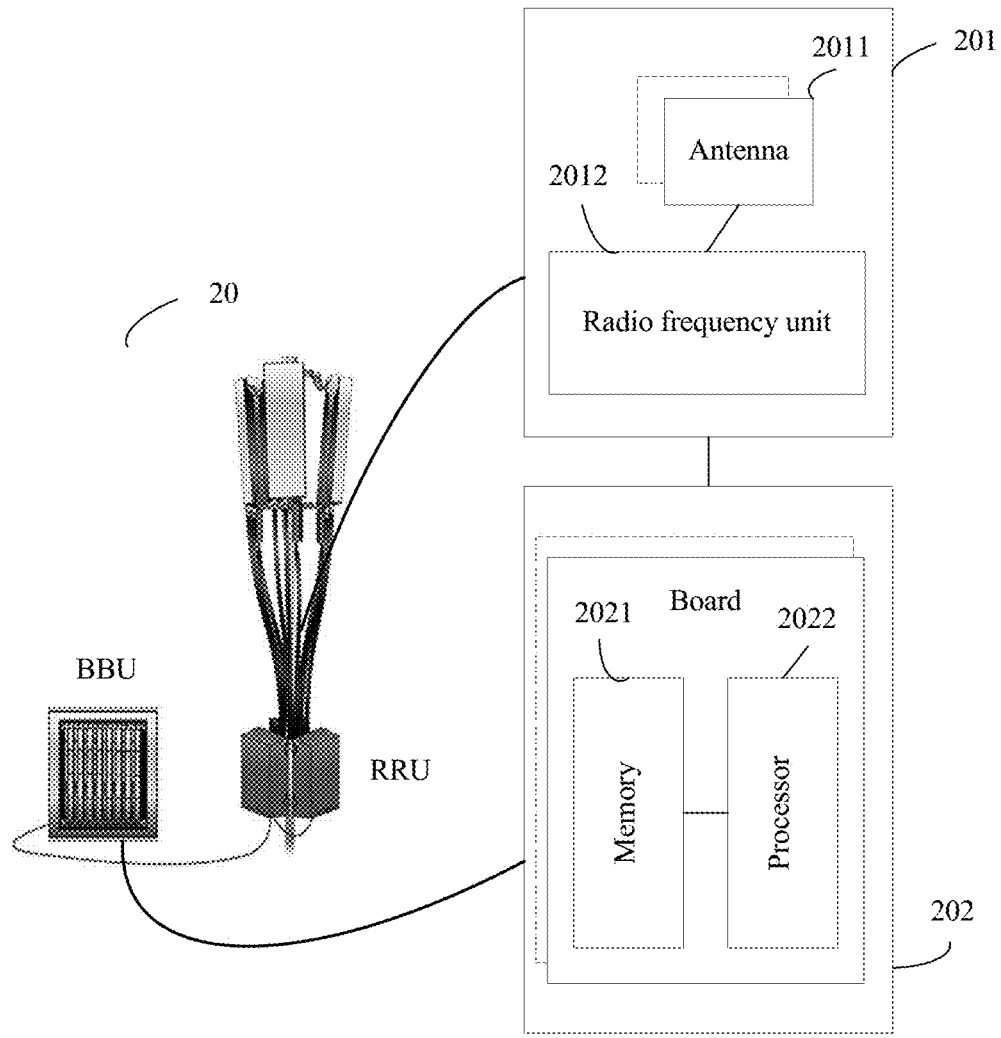
FIG. 7 is a schematic diagram of a network device according to an embodiment of this application.

FIG. 7 is a schematic structural diagram of a network device 20. For example, the network device 20 may be a base station. The network device 20 may be applied to the system shown in FIG. 1, and is configured to perform the method corresponding to FIG. 3 or FIG. 4. The network device 20 includes one or more remote radio units (RRU for short) 201 and one or more baseband units (BBU for short) 202. The RRU 201 may be referred to as a transceiver unit, a transceiver, a transceiver circuit, a transceiver module, or the like, and may include at least one antenna 2011 and at least one radio frequency unit 2012. The RRU 201 is mainly configured to receive and send a radio frequency signal and perform conversion between a radio frequency signal and a baseband signal, for example, is configured to perform information receiving and sending performed by the network device in the foregoing method 300 or 400. The BBU 202 is mainly configured to perform baseband processing, control the network device, and the like. The RRU 201 and the BBU 202 may be physically disposed together, or may be physically separated, for example, a distributed base station.

The BBU 202 is a control center of the network device, may also be referred to as a processing unit, and is mainly configured to complete baseband processing functions such as channel coding, multiplexing, modulation, and spread spectrum. For example, the BBU (the processing unit) may be configured to control the network device to perform processing other than information receiving and sending in the method 300 or the method 400.

In an example, the BBU 202 may include one or more boards. A plurality of boards may jointly support a radio access network of a single access standard (for example, an LTE network), or may separately support radio access networks of different access standards. The BBU 202 further includes a memory 2021 and a processor 2022. The memory 2021 is configured to store an instruction and data that are necessary. The processor 2022 is configured to control the network device to perform a necessary action, for example, is configured to control the network device to perform processing other than information receiving and sending in method 300 or the method 400. The memory 2021 and the processor 2022 may serve one or more boards. In other words, a memory and a processor may be individually disposed on each board. Alternatively, a plurality of boards may share a same memory and processor. In addition, a necessary circuit is further disposed on each board.

Figure 8:
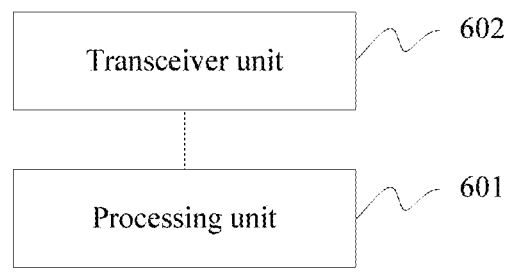
FIG. 8 is a schematic diagram of a terminal according to an embodiment of this application.

FIG. 8 is a schematic diagram of a terminal device 600 according to an embodiment of this application. The terminal device 600 may be applied to the scenario shown in FIG. 1, and is configured to perform the method shown in FIG. 3 or FIG. 4. As shown in FIG. 8, the terminal device 600 includes a processing unit 601 and a transceiver unit 602. The transceiver unit 602 may be specifically configured to perform information receiving and sending performed by the user equipment in the method 300 or the method 400. The processing unit 601 is specifically configured to perform processing other than information receiving and sending performed by the user equipment in the method 300 or the method 400.

For example, in the method 300, the processing unit 601 is configured to determine a second frequency domain resource based on a first frequency domain resource. The first frequency domain resource is a physical random access channel frequency domain resource used by the terminal to send a random access preamble, and the first frequency domain resource and the second frequency domain resource are on a same carrier. The transceiver unit 602 is configured to transmit at least one of uplink physical signal information and uplink physical channel information on the second frequency domain resource.

For example, in the method 400, the transceiver unit 602 is configured to receive the first indication information and the second indication information that are sent by a network device, and the processing unit 601 is configured to determine the plurality of candidate frequency domain resources based on the first indication information, and determine the first frequency domain resource based on the second indication information. The transceiver unit 602 is further configured to send at least one of uplink physical signal information and uplink physical channel information on the first frequency domain resource.

For specific content, refer to specific descriptions in the method 300 or the method 400. Details are not described herein again.

Figure 9:
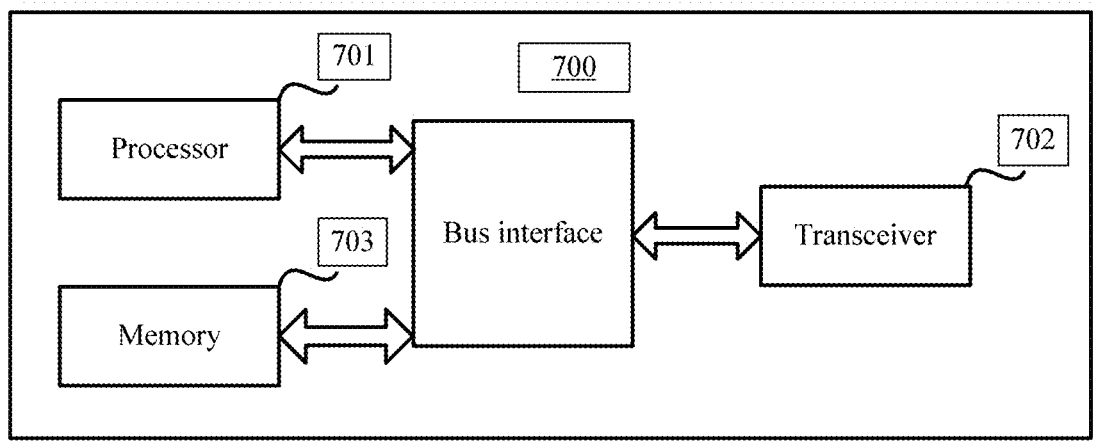
FIG. 9 is a schematic diagram of a terminal according to an embodiment of this application.

It should be understood that division of the foregoing units is merely a logical function division. During actual implementation, all or some of the units may be integrated into one physical entity, or may be physically separated. In this embodiment of this application, the transceiver unit 602 may be implemented by a transceiver, and the processing unit 601 may be implemented by a processor. As shown in FIG. 9, a terminal device 700 may include a processor 701, a transceiver 702, and a memory 703. The memory 703 may be configured to store a program/code that is pre-installed when the terminal device 700 is delivered from a factory, may store code executed by the processor 701, or the like.

It should be understood that the terminal device 700 according to this embodiment of this application may be corresponding to the terminal device in the method 300 or the method 400 according to the embodiment of this application. The transceiver 702 is configured to perform information receiving and sending performed by the user equipment in the method 300 or the method 400, and the processor 701 is configured to perform processing other than information receiving and sending performed by the user equipment in the method 300 or the method 400. Details are not described herein again.

Figure 10:
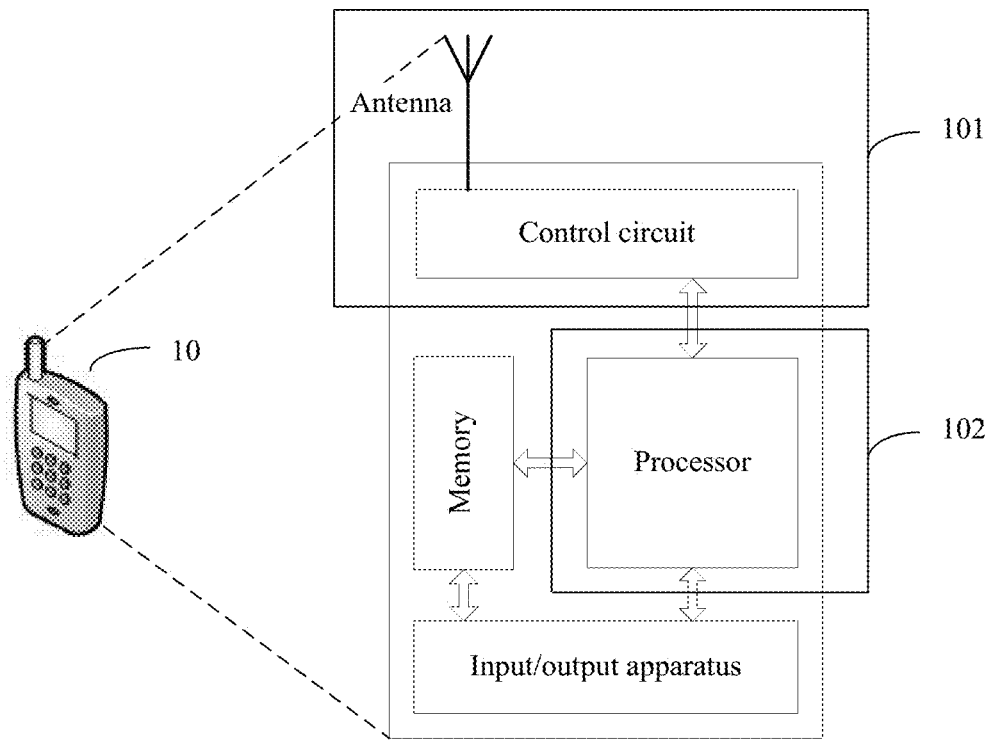
FIG. 10 is a schematic diagram of a terminal according to an embodiment of this application.

FIG. 10 provides a schematic structural diagram of a terminal. The terminal may be applied to the scenario shown in FIG. 1 to perform the method corresponding to FIG. 3 or FIG. 4. For ease of description, FIG. 10 shows only main components of the terminal device. As shown in FIG. 10, a terminal 10 includes a processor, a memory, a control circuit, an antenna, and an input/output apparatus. The control circuit is mainly configured to perform conversion between a baseband signal and a radio frequency signal and process a radio frequency signal. The control circuit and the antenna may be collectively referred to as a transceiver that is mainly configured to receive and send a radio frequency signal of an electromagnetic wave form and receive a signaling indication and/or a reference signal sent by a base station, and is configured to perform information receiving and sending performed by the terminal device in the method 300 or the method 400. For details, refer to the foregoing related descriptions. The processor is mainly configured to: process a communication protocol and communication data, and control the entire terminal device, to execute a software program and process data of the software program, for example, is configured to support the terminal device in performing actions other than information receiving and sending in the method 300 or the method 400. The memory is mainly configured to store a software program and data.

The input/output apparatus such as a touchscreen, a display screen, or a keyboard is mainly configured to receive data entered by a user and output data to the user.

After the terminal is powered on, the processor may read the software program in the memory, interpret and execute an instruction of the software program, and process the data of the software program. When the processor needs to send data in a wireless manner, the processor outputs a baseband signal to a radio frequency circuit after performing baseband processing on to-be-sent data. After performing radio frequency processing on the baseband signal, the radio frequency circuit sends out a radio frequency signal in an electromagnetic wave form by using the antenna. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 10 shows only one memory and processor. Actual user equipment may include a plurality of processors and memories. The memory may also be referred to as a storage medium, a storage device, or the like. This is not limited in this embodiment of this application.

In an optional implementation, the processor may include a baseband processor and a central processing unit. The baseband processor is mainly configured to process a communication protocol and communication data, and the central processing unit is mainly configured to control the entire terminal device, to execute a software program and process data of the software program. The processor in FIG. 10 integrates functions of the baseband processor and the central processing unit. A person skilled in the art may understand that the baseband processor and the central processing unit may be separate processors, and are connected by using a technology such as a bus. A person skilled in the art may understand that the terminal device may include a plurality of baseband processors to adapt to different network standards, the terminal device may include a plurality of central processing units to enhance a processing capability, and various components of the terminal device may be connected by using various buses. The baseband processor may also be expressed as a baseband processing circuit or a baseband processing chip. The central processing unit may also be expressed as a central processing circuit or a central processing chip. Functions of processing the communication protocol and the communication data may be built in the processor, or may be stored in the storage unit in a software program form. The processor executes the software program to implement a baseband processing function.

For example, in this embodiment of this application, the antenna and the control circuit that have receiving and sending functions are considered as a transceiver unit 101 of the terminal device 10, and the processor having a processing function is considered as a processing unit 102 of the UE 10. As shown in FIG. 10, the terminal device 10 includes the transceiver unit 101 and the processing unit 102. The transceiver unit may also be referred to as a transceiver, a transceiver module, a transceiver apparatus, or the like. Optionally, a component that is in the transceiver unit 101 and configured to implement a receiving function is considered as a receiving unit, and a component that is in the transceiver unit 101 and configured to implement a sending function is considered as a sending unit. In other words, the transceiver unit 101 includes the receiving unit and the sending unit. For example, the receiving unit may also be referred to as a receiver, a receiver module, a receiver circuit, or the like, and the sending unit may also be referred to as a transmitter, a transmitter module, a transmit circuit, or the like.

In this embodiment of this application, the transceiver may be a wired transceiver, a wireless transceiver, or a combination thereof. For example, the wired transceiver may be an Ethernet interface. The Ethernet interface may be an optical interface, electrical interface, or a combination thereof. For example, the wireless transceiver may be a wireless local area network transceiver, a cellular network transceiver, or a combination thereof. The processor may be a central processing unit (CPU for short), a network processor (NP for short), or a combination of a CPU and an NP. The processor may further include a hardware chip. The foregoing hardware chip may be an application-specific integrated circuit (ASIC for short), a programmable logic device (PLD for short), or a combination thereof. The foregoing PLD may be a complex programmable logic device (CPLD for short), a field-programmable gate array (FPGA for short), a generic array logic (GAL for short), or any combination thereof. The memory may include a volatile memory such as a random access memory (RAM for short). Alternatively, the memory may include a non-volatile memory (such as a read-only memory (ROM for short), a flash memory, a hard disk drive (HDD for short), or a solid-state drive (SSD for short). Alternatively, the memory may include a combination of the foregoing types of memories.

A bus interface may be further included in FIG. 6 to FIG. 9, and the bus interface may include any quantity of interconnected buses and bridges, and specifically links various circuits of one or more processors represented by the processor and memories represented by the memory. The bus interface may further link together various other circuits such as a peripheral device, a voltage regulator, and a power management circuit, which is well known in the art, and therefore is not further described in this specification. The bus interface provides an interface. The transceiver provides a unit configured to communicate with various other devices on a transmission medium. The processor is responsible for managing a bus architecture and general processing. The memory may store data used when the processor performs an operation.

A person skilled in the art may further understand that various illustrative logical blocks and steps that are listed in the embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the protection scope of the embodiments of this application.

The various illustrative logical units and circuits described in the embodiments of this application may implement or operate the described functions by using a general-purpose processor, a digital signal processor, an application-specific integrated circuit (ASIC), a field-programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor, so that the processor may read information from the storage medium and write information to the storage medium. Optionally, the storage medium may be further integrated into a processor. The processor and the storage medium may be arranged in an ASIC, and the ASIC may be arranged in UE. Optionally, the processor and the storage medium may be arranged in different components of the UE.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid state disk (SSD)), or the like.

Each part of this specification is described in a progressive manner; for same or similar parts in the embodiments, refer to these embodiments; each embodiment focuses on a difference from other embodiments. Especially, apparatus and system embodiments are basically similar to a method embodiment, and therefore are described briefly; for related parts, refer to descriptions in the method embodiment.

According to the foregoing description of this specification in this application, a person in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs but may also be extended to a maximum scope that is consistent with the principles and disclosed new features of this application.

What is claimed is:

1. A method comprising:
   receiving, by an apparatus, a system information block from a network device, wherein the system information block indicates at least one offset and a plurality of candidate frequency resources;
   sending, by the apparatus in a random access procedure, a random access preamble to the network device in a physical random access channel frequency resource, wherein an offset of the at least one offset is between the physical random access channel frequency resource and an uplink bandwidth part of the plurality of candidate frequency resources; and
   sending, by the apparatus in the random access procedure, a random access message to the network device in the uplink bandwidth part.

2. The method according to claim 1, further comprising:
   selecting, by the apparatus, the uplink bandwidth part from the plurality of candidate frequency resources based on a mapping relationship between the physical random access channel frequency resource and the uplink bandwidth part.

3. The method according to claim 2, wherein the uplink bandwidth part is selected during an initial access procedure.

4. A method comprising:
   sending, by a network device, a system information block to a terminal, wherein the system information block indicates at least one offset and a plurality of candidate frequency resources;
   receiving, by the network device, a random access preamble from the terminal in a physical random access channel frequency resource, wherein an offset of the at least one offset is between the physical random access channel frequency resource and an uplink bandwidth part of the plurality of the candidate frequency resources; and
   receiving, by the network device after receiving the random access preamble from the terminal, a random access message from the terminal in the uplink bandwidth part.

5. The method according to claim 4, further comprising:
   selecting, by the network device, the uplink bandwidth part from the plurality of candidate frequency resources based on a mapping relationship between the physical random access channel frequency resource and the uplink bandwidth part.

6. The method according to claim 5, wherein the uplink bandwidth part is selected by the network device during an initial access procedure.

7. An apparatus comprising:
   a non-transitory memory storage comprising instructions; and
   one or more processors in communication with the memory storage, wherein the one or more processors execute the instructions to:
   receive a system information block from a network device, wherein the system information block indicates at least one offset and a plurality of candidate frequency resources;

send, in a random access procedure, a random access preamble to the network device in a physical random access channel frequency resource, wherein an offset of the at least one offset is between the physical random access channel frequency resource and an uplink bandwidth part of the plurality of the candidate frequency resources; and send, in the random access procedure, a random access message to the network device in the uplink bandwidth part.

8. The apparatus according to claim 7, wherein the one or more processors execute the instructions further to select the uplink bandwidth part from the plurality of candidate frequency resources based on a mapping relationship between the physical random access channel frequency resource and the uplink bandwidth part.

9. The apparatus according to claim 8, wherein the uplink bandwidth part is selected during an initial access procedure.

10. An apparatus, comprising:
a non-transitory memory storage comprising instructions; and
one or more processors in communication with the memory storage, wherein the one or more processors execute the instructions to:
send a system information block to a terminal, wherein the system information block indicates at least one offset and a plurality of candidate frequency resources;
receive a random access preamble from the terminal in a physical random access channel frequency resource, wherein an offset of the at least one offset is between the physical random access channel frequency resource and an uplink bandwidth part.

11. The apparatus according to claim 10, wherein the one or more processors execute the instructions further to select the uplink bandwidth part from the plurality of candidate frequency resources based on a mapping relationship between the physical random access channel frequency resource and the uplink bandwidth part.

12. The apparatus according to claim 11, wherein the uplink bandwidth part is selected by the apparatus during an initial access procedure.

* * * * *

UNITED STATES PATENT AND TRADEMARK OFFICE
CERTIFICATE OF CORRECTION

PATENT NO. : 11,259,335 B2  Page 1 of 1
APPLICATION NO. : 16/786280
DATED : February 22, 2022
INVENTOR(S) : Junchao Li It is certified that error appears in the above-identified patent and that said Letters Patent is hereby corrected as shown below:

In the Claims

Claim 10, Column 32, Line 11; after "an uplink bandwidth part", insert --of the plurality of the candidate frequency resources; and receive, after receiving the random access preamble from the terminal, a random access message from the terminal in the uplink bandwidth part.--

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*